US010412251B2

(12) United States Patent
Osako et al.

(10) Patent No.: US 10,412,251 B2
(45) Date of Patent: Sep. 10, 2019

(54) IMAGE PROCESSING APPARATUS FOR DEBUGGING A HARDWARE EMULATION PROCESS

(71) Applicant: Konica Minolta, Inc., Chiyoda-ku, Tokyo (JP)

(72) Inventors: Satoshi Osako, Hachioji (JP); Shigeyuki Ueda, Kodaira (JP); Masao Hosono, Itami (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 0 days.

(21) Appl. No.: 15/623,546

(22) Filed: Jun. 15, 2017

(65) Prior Publication Data
US 2017/0374219 A1    Dec. 28, 2017

(30) Foreign Application Priority Data

Jun. 24, 2016 (JP) .................. 2016-125226

(51) Int. Cl.
| | |
|---|---|
| G06F 3/12 | (2006.01) |
| H04N 1/00 | (2006.01) |
| G06F 9/455 | (2018.01) |
| G06F 11/36 | (2006.01) |

(52) U.S. Cl.
CPC ......... *H04N 1/00941* (2013.01); *G06F 3/121* (2013.01); *G06F 3/1229* (2013.01); *G06F 3/1285* (2013.01); *G06F 3/1297* (2013.01); *G06F 9/455* (2013.01); *G06F 11/3648* (2013.01); *G06F 11/3652* (2013.01); *H04N 1/0097* (2013.01); *H04N 1/00344* (2013.01); *H04N 2201/0094* (2013.01)

(58) Field of Classification Search
CPC . H04N 1/00941; G06F 11/3648; G06F 9/455; G06F 3/1297
See application file for complete search history.

(56) References Cited

U.S. PATENT DOCUMENTS

| | | | | |
|---|---|---|---|---|
| 2011/0119665 | A1* | 5/2011 | Santos | G06F 9/45558 718/1 |
| 2013/0007730 | A1* | 1/2013 | Hotra | G06F 9/45558 718/1 |
| 2016/0314239 | A1* | 10/2016 | Rabinovitch | G06F 17/5081 |
| 2017/0357471 | A1* | 12/2017 | Hosono | G03G 15/50 |

FOREIGN PATENT DOCUMENTS

JP    2013-012196 A    1/2013

* cited by examiner

*Primary Examiner* — Benjamin O Dulaney
(74) *Attorney, Agent, or Firm* — Buchanan Ingersoll & Rooney PC

(57) ABSTRACT

An image processing apparatus includes a host controller that controls a hardware resource, a guest controller, an emulator that is provided between the host controller and the guest controller and allows the guest controller to control the hardware resource, and a changer that changes an HDL program, wherein the guest controller includes a guest driver, the emulator includes a device emulator that emulates the hardware resource by executing the changed HDL program, and a switcher that switches control to any one of a first control for controlling the host controller in accordance with control of the hardware resource by the guest driver and allowing the hardware resource to be controlled, and a second control for controlling the device emulator in accordance with the control of the hardware resource by the guest driver.

19 Claims, 9 Drawing Sheets

F I G. 5A

```
#include "systemc.h"
SC_MODULE(adder)       // MODULE (CLASS) DECLARATION
{
  sc_in<int>a,b;       // PORT
  sc_out<int>sum;
  void do_add()        // PROCESS
  {
    sum = a + b;
  }
  SC_CTOR(adder)       // CONSTRUCTOR
  {
    SC_METHOD(do_add); // REGISTER do_add IN KERNEL
    sensitive<<a<<b;   // ADD do_add TO SENSITIVITY LIST
  }
}
```
⎫ 301

F I G. 5B

```
#include "systemc.h"
SC_MODULE(adder)       // MODULE (CLASS) DECLARATION
{
  sc_in<int>a,b;       // PORT
  sc_out<int>sum;
  void do_add()        // PROCESS
  {
    sum = a + b;
    wait(20,SC_MS);    // WAIT (20ms)           ~303
  }
  SC_CTOR(adder)       // CONSTRUCTOR
  {
    SC_METHOD(do_add); // REGISTER do_add IN KERNEL
    sensitive<<a<<b;   // ADD do_add TO SENSITIVITY LIST
  }
}
```
⎫ 301

F I G. 6A

```
#include "systemc.h"
SC_MODULE(adder)       // MODULE (CLASS) DECLARATION
{
    sc_in<int> a, b;    // PORT         ~312
    sc_out<int> sum;
    void do_add()       // PROCESS
    {
        sum = a + b;    ~315
    }
    SC_CTOR(adder)      // CONSTRUCTOR
    {
        SC_METHOD(do_add); //REGISTER do_add IN KERNEL
        sensitive << a << b; //ADD do_add TO SENSITIVITY LIST
    }
};
```
⎫
⎬ 311
⎭

F I G. 6B

```
#include "systemc.h"
SC_MODULE(adder)       //MODULE (CLASS) DECLARATION
{
    sc_in<int> a, b;    // PORT         ~312
    sc_out<int> sum;
    void do_add()       // PROCESS
    {
        if( (a < 0) || (a > 255) ){   //PARAMETER CHECK
            ERROR PROCESS
        }
        sum = a + b;    ~315
    }
    SC_CTOR(adder)      // CONSTRUCTOR
    {
        SC_METHOD(do_add); //REGISTER do_add IN KERNEL
        sensitive << a << b; //ADD do_add TO SENSITIVITY LIST
    }
};
```
⎫
⎬ 311 313
⎭

F I G. 7A

```
#include "systemc.h"
SC_MODULE(adder)    //MODULE (CLASS) DECLARATION
{
  sc_in<int> a, b;   // PORT
  sc_out<int> sum1;
  void do_add()      // PROCESS
  {                            ~322
    static sc_int<32> sum2 = 0;
    sum1 = a + b;              ~325
    sum2 = sum2 + sum1;
  }
  SC_CTOR(adder)     // CONSTRUCTOR
  {
    SC_METHOD(do_add);  //REGISTER do_add IN KERNEL
    sensitive << a << b; //ADD do_add TO SENSITIVITY LIST
  }
}
```

321

F I G. 7B

```
#include "systemc.h"
SC_MODULE(adder)    //MODULE (CLASS) DECLARATION
{
  sc_in<int> a, b;   // PORT
  sc_out<int> sum1;
  void do_add()      // PROCESS
  {                            ~322
    static sc_int<32> sum2 = 0;
    sum1 = a + b;              ~325
    sum2 = sum2 + sum1;
    if( sum2 < 1023 ) || ( sum2 > 65536 ){  //STATUS VALUE
    ERROR PROCESS                              CHECK
    }
  }
  SC_CTOR(adder)     // CONSTRUCTOR
  {
    SC_METHOD(do_add);  //REGISTER do_add IN KERNEL
    sensitive << a << b; //ADD do_add TO SENSITIVITY LIST
  }
}
```

321
323

IMAGE PROCESSING APPARATUS FOR DEBUGGING A HARDWARE EMULATION PROCESS

This application is based on Japanese Patent Application No. 2016-125226 filed with Japan Patent Office on Jun. 24, 2016, the entire content of which is hereby incorporated by reference.

BACKGROUND OF THE INVENTION

Field of the Invention

The present invention relates to an image processing apparatus, a debugging assistance method and a non-transitory computer-readable recording medium encoded with a debugging assistance program. In particular, the present invention relates to an image processing apparatus in which a plurality of operating systems are installed, a debugging assistance method performed in the image processing apparatus and a non-transitory computer-readable recording medium encoded with a debugging assistance program executed in the image processing apparatus.

Description of the Related Art

An MFP (Multi Function Peripheral), which is represented by an image processing apparatus that processes images, includes various types of hardware resources, and the hardware resources are controlled by a CPU. The hardware resources are an ASIC (Application Specific Integrated Circuit) for processing image data and an engine that forms an image on a sheet of paper, for example. Further, an application program is installed in the MFP, and the application program sometimes includes a process of controlling a hardware resource. In a stage where such an application program is developed, it is necessary to allow a process of controlling the hardware resource defined by the application program to be compatible with an operation of the hardware resource. In particular, in the case where a plurality of application programs control one hardware resource, an error sometimes occurs because of collision of controls. In this case, there is a method for executing the application programs and checking the compatibility with the hardware resource in a stage where the application program is actually completed.

However, in the case where a cause of an error is present in a time period from the time when the application program controls the hardware resource until the time when the hardware resource responds, there is a problem that probability of an occurrence of the error is low because the time period from the time when the hardware resource is controlled until the time when a response is given is short, and it is difficult to specify the cause of the error. For example, Japanese Patent Application Laid-Open No. 2013-012196 discloses a technique, which is a method used for execution of a software application by a target hardware platform, including determining a description in a hardware description language (HDL) for the target hardware platform, and configuring a programmable hardware component functionally equivalent to the target hardware platform based on the HDL description. However, even if the method described in Japanese Patent Application Laid-Open No. 2013-012196 is employed, a programmable hardware component must be configured to accept a delay of a response by the ASIC. It is not realistic because of the cost to be spent in order to configure the programmable hardware component having such a specification.

SUMMARY OF THE INVENTION

According to one aspect of the present invention, an image processing apparatus includes a hardware processor, wherein the hardware processor includes a host controller that is formed by execution of an operating system program and controls a hardware resource, a guest controller that is formed by execution of the same operating system program, an emulator that is provided between the host controller and the guest controller and allows the guest controller to control the hardware resource, and a changer that changes an HDL program describing a process executable by the hardware resource in a hardware description language, the guest controller includes a guest driver that is formed by execution of a driver program for controlling the hardware resource, the emulator includes a device emulator that emulates the hardware resource by executing the changed HDL program, and a switcher that switches control to any one of a first control for controlling the host controller in accordance with control of the hardware resource by the guest driver and allowing the hardware resource to be controlled, and a second control for controlling the device emulator in accordance with the control of the hardware resource by the guest driver.

According to another aspect of the present invention, a debugging assistance method for debugging an application program executed in an image processing apparatus, the image processing apparatus including a host controller that is formed by execution of an operating system program and controls a hardware resource, a guest controller that is formed by execution of the same operating system program, and an emulator that is provided between the host controller and the guest controller and allows the guest controller to control the hardware resource, wherein the guest controller includes a guest driver that is formed by execution of a driver program for controlling the hardware resource, and the debugging assistance method includes a changing step of changing an HDL program that describes a process executable by the hardware resource in a hardware description language, and a switching step of switching control to any one of a first control for controlling the host controller in accordance with control of the hardware resource by the guest driver and allowing the hardware resource to be controlled, and a second control for executing the changed HDL program for emulation of the hardware resource in accordance with the control of the hardware resource by the guest driver.

According to yet another aspect of the present invention, a non-transitory computer-readable recording medium encoded with a debugging assistance program allows a computer that controls the image processing apparatus to perform the above-mentioned debugging assistance method.

The foregoing and other features, aspects, and advantages of the present invention will become more apparent from the following detailed description of the present invention when taken in conjunction with the accompanying drawings.

BRIEF DESCRIPTION OF THE DRAWINGS

FIGS. 5A and 5B are diagrams for explaining addition of an extension command;

FIGS. 6A and 6B are diagrams for explaining addition of a parameter check command;

FIGS. 7A and 7B are diagrams for explaining addition of a variable check command;

DESCRIPTION OF THE PREFERRED EMBODIMENTS

Figure 1:
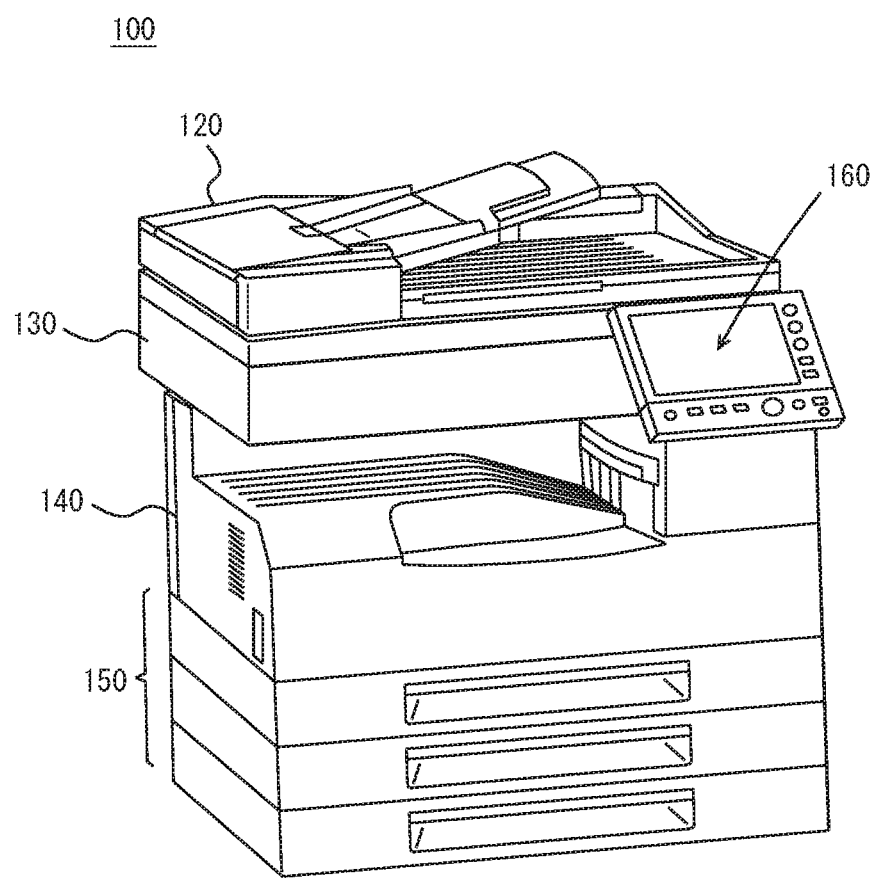
FIG. 1 is a perspective view showing the appearance of an MFP in the present embodiment.

Embodiments of the present invention will be described below with reference to the drawings. In the following description, the same parts are denoted with the same reference characters. Their names and functions are also the same. Thus, a detailed description thereof will not be repeated.

Figure 2:
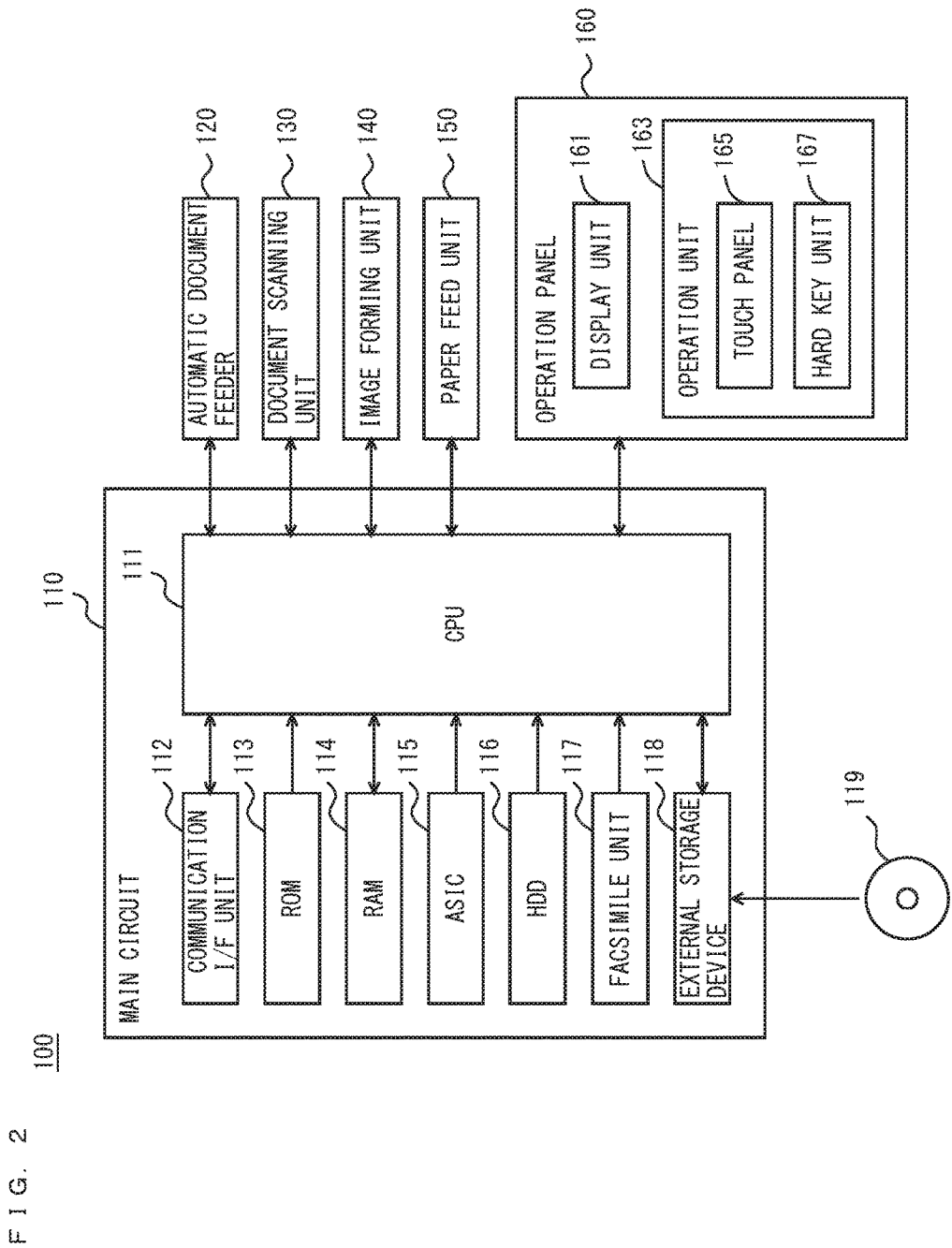
FIG. 2 is a block diagram showing an outline of a hardware configuration of the MFP in the present embodiment.

FIG. 1 is a perspective view showing the appearance of an MFP in the present embodiment. FIG. 2 is a block diagram showing the outline of the hardware configuration of the MFP in the present embodiment. Referring to FIGS. 1 and 2, the MFP 100 that functions as an image processing apparatus includes a main circuit 110, a document scanning unit 130 for scanning a document, an automatic document feeder 120 for conveying a document to the document scanning unit 130, an image forming unit 140 for forming an image on a sheet of paper or other medium based on image data output by the document scanning unit 130 that has scanned a document, a paper feed unit 150 for supplying sheets of paper to the image forming unit 140, and an operation panel 160 serving as a user interface.

The main circuit 110 includes a CPU (Central Processing Unit) 111, a communication interface (I/F) unit 112, a ROM 113, a RAM 114, an ASIC 115, a hard disk drive (HDD) 116 as a mass storage, a facsimile unit 117, and an external storage device 118 on which a CD-ROM (Compact Disk ROM) 119 is mounted. The CPU 111 is connected to the automatic document feeder 120, the document scanning unit 130, the image forming unit 140, the paper feed unit 150 and the operation panel 160, and controls the entire MFP 100.

The ROM 113 stores a program executed by the CPU 111 or data necessary for execution of the program. The RAM 114 is used as a work area when the CPU 111 executes a program.

The ASIC 115 is controlled by the CPU 111 and processes image data. Although the image process executed by the ASIC 115 is not limited to a particular type, it includes a format conversion process of converting a format of image data, a compression process of encoding image data, and an image process of processing an image of image data, for example. The image process includes a process of emphasizing an edge of an image, a smoothing process of smoothing gradation, a color matching process of matching colors, a combination process of combining images and the like.

The communication I/F unit 112 is an interface for connecting the MFP 100 to the network. The CPU 111 communicates with a computer connected to the network via the communication I/F unit 112 for transmitting and receiving data. Further, the communication I/F unit 112 can communicate with a computer connected to the Internet via the network.

The facsimile unit 117 is connected to the public switched telephone networks (PSTN) and transmits facsimile data to or receives facsimile data from the PSTN. The facsimile unit 117 stores the received facsimile data in the HDD 116 or outputs the received facsimile data to the image forming unit 140. The image forming unit 140 prints the facsimile data received by the facsimile unit 117 on a sheet of paper. Further, the facsimile unit 117 converts the data stored in the HDD 116 into facsimile data, and transmits the facsimile data to a facsimile device connected to the PSTN.

The external storage device 118 is mounted with the CD-ROM 119. The CPU 111 is capable of accessing the CD-ROM 119 via the external storage device 118. The CPU 111 loads a program, recorded in the CD-ROM 119 which is mounted on the external storage device 118, into the RAM 114 for execution. The medium for storing the program executed by the CPU 111 is not limited to the CD-ROM 119. It may be an optical disk (MO (Magnetic Optical Disk)/MD (Mini Disk)/DVD (Digital Versatile Disk)), an IC card, an optical card, and a semiconductor memory such as a mask ROM, an EPROM (Erasable Programmable ROM) and an EEPROM (Electrically EPROM).

Further, the program executed by the CPU 111 is not limited to the program recorded in the CD-ROM 119, and CPU 111 may load a program, stored in the HDD 116, into RAM 114 for execution. In this case, another computer connected to the network may rewrite the program stored in the HDD 116 of the MFP 100, or may additionally write a new program therein. Further, the MFP 100 may download a program from another computer connected to the network, and store the program in the HDD 116. The program referred to here includes not only a program directly executable by the CPU 111 but also a source program, a compressed program, an encrypted program or the like.

The operation panel 160 includes a display unit 161 and an operation unit 163. The display unit 161 is a Liquid Crystal Display (LCD) device or an organic ELD (Electroluminescence Display) device, for example, and displays instruction menus to users, information about the acquired image data, and the like. The operation unit 163 includes a touch panel 165 and a hard key unit 167. The touch panel 165 is a capacitance type. Not only the capacitance type but also another type such as a resistive film type, a surface acoustic wave type, an infrared type and an electromagnetic induction type can be used for the touch panel 165. The hard key unit 167 includes a plurality of hard keys. The hard keys are contact switches, for example.

Figure 3:
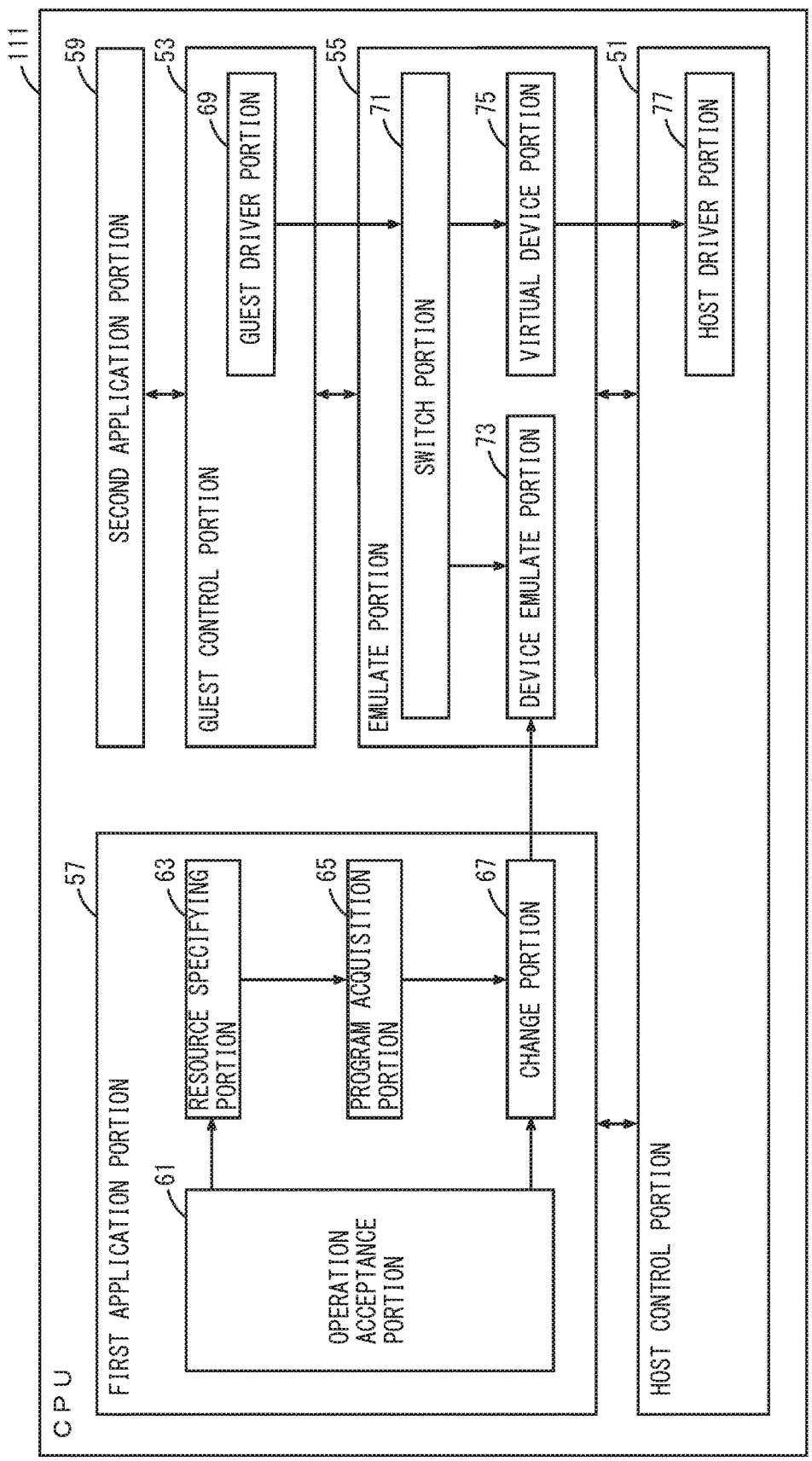
FIG. 3 is a diagram showing one example of functions of a CPU included in the MFP in the present embodiment.

FIG. 3 is a diagram showing one example of functions of the CPU included in the MFP in the present embodiment. Referring to FIG. 3, the CPU 111 includes a host control portion 51, a guest control portion 53, an emulate portion 55, a first application portion 57 and a second application program 59.

The host control portion 51 is a task formed in the case where the CPU 111 executes an operating system program. The host control portion 51 controls hardware resources included in the MFP 100. The hardware resources include the communication I/F unit 112, the ROM 113, the RAM 114, the ASIC 115, the HDD 116, the facsimile unit 117, the external storage device 118, the automatic document feeder 120, the document scanning unit 130, the image forming unit 140, the paper feed unit 150 and the operation panel 160. The host control portion 51 includes a plurality of tasks respectively formed by execution of a plurality of driver programs for respectively controlling a plurality of hardware resources included in the MFP 100. A driver program for controlling the ASIC 115 is described here as an example of a driver program. The host control portion 51 includes a host driver portion 77, which is a task formed by execution of the driver program for controlling the ASIC 115.

The guest control portion 53 is a task formed in the case where the CPU 111 executes an operating system program. The operating system program that is executed by the CPU 111 when the guest control portion 53 is formed is the same as the operating system program that is executed by the CPU 111 when the host control portion 51 is formed. The guest control portion 53 includes a plurality of tasks respectively formed by execution of a plurality of driver programs for respectively controlling the plurality of hardware resources included in the MFP 100. A driver program for controlling the ASIC 115 will be described here as an example of a driver program. The host control portion 51 includes a guest driver portion 69 that is a task formed by execution of the driver program for controlling the ASIC 115.

The emulate portion 55 is a task formed in the case where the CPU 111 executes an emulate program. The emulate program is an application program compatible with the operating system program that is executed by the CPU 111 when the host control portion 51 is formed. The emulate portion 55 is a virtual device for the guest control portion 53, and emulates the control of a hardware resource by the host control portion 51. The emulate portion 55 allows the guest control portion 53 to function as a virtual machine. Thus, the guest control portion 53 can control the hardware resources included in the MFP 100.

The first application portion 57 is a task formed by execution of a first application program compatible with the operating system program. The first application portion 57 controls the host control portion 51, thereby being capable of controlling the hardware resources included in the MFP 100.

Each of the first application portion 57 and the emulate portion 55 can control the host control portion 51 and is managed by the host control portion 55. Therefore, the first application portion 57 and the emulate portion 55 can identify each other, thereby being capable of communicating with each other by using inter-process communication.

The second application portion 59 is a task formed by execution of a second application program compatible with the operating system program. The second application portion 59 controls the guest control portion 53, thereby being capable of controlling the hardware resources included in the MFP 100. In other words, in the case where the second application program describes a process of controlling the hardware resources, the second application program 59 controls the guest control portion 53 and controls the hardware resources included in the MFP 100.

The first application portion 57 includes an operation acceptance portion 61 for accepting an operation by a user, a resource specifying portion 63 for specifying any one of the hardware resources, a program acquisition portion 65 and a change portion 67. The operation acceptance portion 61 controls the operation panel 160 and accepts an operation of inputting in the operation unit 163 by the user. In the case where the user operates a portable information device such as a smartphone and remotely operates the MFP 100, the operation acceptance portion 61 controls the communication I/F unit 112 and accepts an operation received from the portable information device with which the communication I/F unit 112 communicates. In the case where accepting an operation by the user, the operation acceptance portion 61 outputs the accepted operation to each of the resource specifying portion 63 and the change portion 67.

The resource specifying portion 63 specifies a hardware resource. For example, the resource specifying portion 63 displays a list including the communication I/F unit 112, the ROM 113, the RAM 114, the ASIC 115, the HDD 116, the facsimile unit 117, the external storage device 118, the automatic document feeder 120, the document scanning unit 130, the image forming unit 140, the paper feed unit 150 and the operation panel 160, which are the hardware resources, in a selectable manner. Further, the resource specifying portion 63 specifies a hardware resource selected by an operation received from the operation acceptance portion 61. The resource specifying portion 63 outputs program identification information for identifying the specified hardware resource to the program acquisition portion 65. The case where the ASIC 115 is selected by the user is described here as an example.

In response to reception of the identification information of the hardware resource from the resource specifying portion 63, the program acquisition portion 65 acquires a hardware description language (HDL) program compatible with the hardware resource identified by the identification information. For example, in the case where an HDL program for at least one of the plurality of hardware resources is stored in the HDD 116, if the HDL program compatible with the hardware resource specified by the program identification information received from the resource specifying portion 63 is stored in the HDD 116, the program acquisition portion 65 reads out the HDL program. The HDL program compatible with the hardware resource may be acquired from a manufacturer of the hardware resource. The program acquisition portion 65 outputs the acquired HDL program to the change portion 67. Because the ASIC 115 is selected here by the user according to the resource specifying portion 63, the program acquisition portion 65 acquires the HDL program compatible with the ASIC 115 and outputs the HDL program to the change portion 67.

The change portion 67 changes the HDL program in accordance with an operation of the user received from the operation acceptance portion 61. The change portion 67 generates an execution format device emulate program by compiling the changed HDL program, and outputs the device emulate program to the emulate portion 55. The change portion 67 here changes the HDL program compatible with the ASIC 115 and compiles the changed HDL program. Thus, the change portion 67 outputs the device emulate program compatible with the ASIC 115 to the emulate portion 55.

The emulate portion 55 includes a switch portion 71, a device emulate portion 73 and a virtual device portion 75. The device emulate portion 73 is formed by execution of the device emulate program, compatible with the ASIC 115, received from the change portion 67. The device emulate portion 73 emulates the ASIC 115 in accordance with the control of the ASIC 115 by the guest driver portion 69. However, as for the process changed by the change portion 67, the device emulate portion 73 executes a process different from a process executed by the ASIC 115.

The virtual device portion 75 functions as a virtual device of the ASIC 115 for the guest driver portion 69. Specifically, the virtual device portion 75 controls the host driver portion 77 of the host control portion 51 in accordance with the control of the ASIC 115 by the guest driver portion 69, and allows the host driver portion 77 to control the ASIC 115.

The switch portion 71 switches the control to any one of a first control for outputting the output of the guest driver portion 69 to the virtual device portion 75, and a second control for outputting the output of the guest driver portion 69 to the device emulate portion 73. According to a switch instruction input in the operation unit 163 by the user, the switch portion 71 switches the control to any one of the first control and the second control. In the case where the switch portion 71 switches the control to the first control, the control of the ASIC 115 by the guest driver portion 69 is output to the ASIC 115, so that the ASIC 115 is controlled. In the case where the switch portion 71 switches the control to the second control, the control of the ASIC 115 by the guest driver is output to the device emulate portion 73, so that the device emulate portion 73 is controlled.

Figure 4:
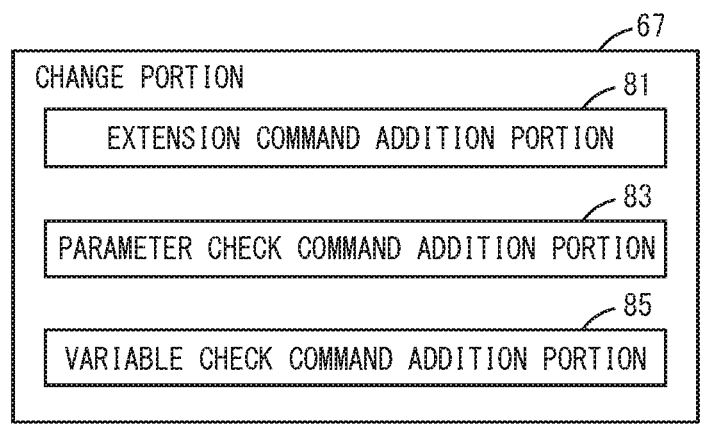
FIG. 4 is a block diagram showing one example of detailed functions of a change portion.

FIG. 4 is a block diagram showing one example of the detailed functions of the change portion. Referring to FIG. 4, the change portion 67 includes an extension command addition portion 81, a parameter check command addition portion 83 and a variable check command addition portion 85. The extension command addition portion 81 adds a command for delaying a time point at which a response to a target process to be changed designated by the user is given. For example, the extension command addition portion 81 analyzes the HDL program, specifies one or more processes defined by the HDL program, displays a list of the one or more specified processes in the display unit 161 in a selectable manner, and specifies a process selected by an operation by the user received from the operation acceptance portion 61 as a target process to be changed. The extension command addition portion 81 displays a screen for setting a delay time point in the display unit 161, and sets a time point specified by an operation by the user received from the operation acceptance portion 61 as the delay time point. The extension command addition portion 81 adds an extension command for waiting until the delay time point to the end of a segment describing the target process to be changed in the HDL program.

The parameter check command addition portion 83 adds a command for checking a parameter input in the ASIC 115. For example, the parameter check command addition portion 83 analyzes the HDL program, specifies one or more processes defined by the HDL program, displays a list of one or more specified processes in the display unit 161 in a selectable manner, and specifies a process selected by an operation of the user received from the operation acceptance portion 61 as a target process to be changed. Next, the parameter check command addition portion 83 analyzes the HDL program, specifies a parameter defined by the HDL program for the target process to be changed, displays a list of one or more specified parameters in the display unit 161 in a selectable manner, and specifies a parameter selected by an operation of the user received from the operation acceptance portion 61 as a target parameter. The parameter check command addition portion 83 displays a screen for setting a range, which the parameter can take, in the display unit 161, and sets a range specified by an operation of the user received from the operation acceptance portion 61 as the range, which the target parameter can take. The parameter check command addition portion 83 adds parameter check commands including a command for detecting that the parameter is outside of the set range and a command for indicating a process to be executed in the case where it is detected that the parameter is outside of the set range, to a segment preceding a segment that describes a process in which the parameter is used in the HDL program.

The variable check command addition portion 85 adds a command for checking a variable used by the ASIC 115. For example, the variable check command addition portion 85 analyzes the HDL program, specifies one or more processes defined by the HDL program, displays a list of one or more specified processes in the display unit 161 in a selectable manner, and specifies a process selected by an operation of the user received from the operation acceptance portion 61 as a target process to be changed. Next, the variable check command addition portion 85 analyzes the HDL program, specifies a variable defined by the HDL program for the target process to be changed, displays one or more specified variables in the display unit 161 in a selectable manner, and specifies a variable selected by an operation of the user received from the operation acceptance portion 61 as a target variable. The variable check command addition portion 85 displays a screen for setting a range, which the target variable can take, in the display unit 161, and sets a range specified by an operation of the user received from the operation acceptance portion 61 as the range, which the target variable can take. The variable check command addition portion 85 adds variable check commands, including a command for detecting that the target variable is outside of the set range and a command for indicating a process to be executed in the case where it is detected that the target variable is outside of the set range, to a segment succeeding a segment that describes a process in which the target variable is used in the HDL program.

FIGS. 5A and 5B are diagrams for describing the addition of an extension command. FIG. 5A is a diagram showing one example of the HDL program before the extension command is added. Referring to FIG. 5A, the HDL program includes a description 301 of a target process to be changed. The target process to be changed is indicated here as "process do_add ( )". FIG. 5B is a diagram showing one example of the HDL program after the extension command is added. Referring to FIG. 5B, an extension command 303 indicated by "wait (20, SC_MS)" is added to the end of the description 301 of the target process to be changed. "wait (20, SC_MS), which is the extension command 303, indicates to wait for 20 ms.

FIGS. 6A and 6B are diagrams for describing the addition of a parameter check command. FIG. 6A is a diagram showing one example of the HDL program before the parameter check command is added. Referring to FIG. 6A, the HDL program includes a description 311 of a target process to be changed. The target process to be changed is indicated here as "process do_add ( )". Further, the HDL program includes a description 312 of a parameter as data that is input in the target process to be changed. The parameters are indicated here by "a" and "b". "process do_add ( )", which is the target process to be changed, includes a description 315 for processing the parameters "a" and "b". The description 315 for processing the parameters "a" and "b" is indicated by "sum a+b".

FIG. 6B is a diagram showing one example of the HDL program after the parameter check command is added. Referring to FIG. 6B, the HDL program includes a description 313 of the parameter check command preceding the description 315 for processing the parameters "a" and "b". The parameter check command includes "if(a<0)||(a>255)" as a command for detecting that the parameter is outside of the set range, and "error process" as a command for indicating a process to be executed in the case where it is detected that the parameter is outside of the set range. The range of the parameter is from 0 or more to 25 or less. The command for indicating a process to be executed in the case where it is detected that the parameter is outside of the set range is indicated as "error process", which does not say an actual command.

FIGS. 7A and 7B are diagrams for describing the addition of a variable check command. FIG. 7A is a diagram showing one example of the HDL program before the variable check command is added. Referring to FIG. 7A, the HDL program includes a description 321 of a target process to be changed. The target process to be changed is indicated here as "process do_add ( )". Further, the HDL program includes a description 322 of a variable used in a target process to be changed. The variable is indicated here by "sum2". "process do_add ( )", which is a target process to be changed, includes a description 325 for processing the variable "sum2". The description 325 for processing the variable "sum2" is indicated by "sum2=sum2+sum1".

FIG. 7B is a diagram showing one example of the HDL program after the variable check command is added. Referring to FIG. 7B, the HDL program includes a description 323 of the variable check command succeeding the description 325 for processing the variable "sum2". The description 323 of the variable check command includes "if (sum2<1023)||(sum2>65536)" as a command for detecting that the variable is outside of the set range, and "error process" as a command for indicating a process to be executed in the case where it is detected that the variable is outside of the set range. The range of the variable is from 1023 or more to 65536 or less. Further, a command for indicating a process to be executed in the case where it is detected that the variable is outside of the set range is indicated as "error process", which does not say an actual command.

Figure 8:
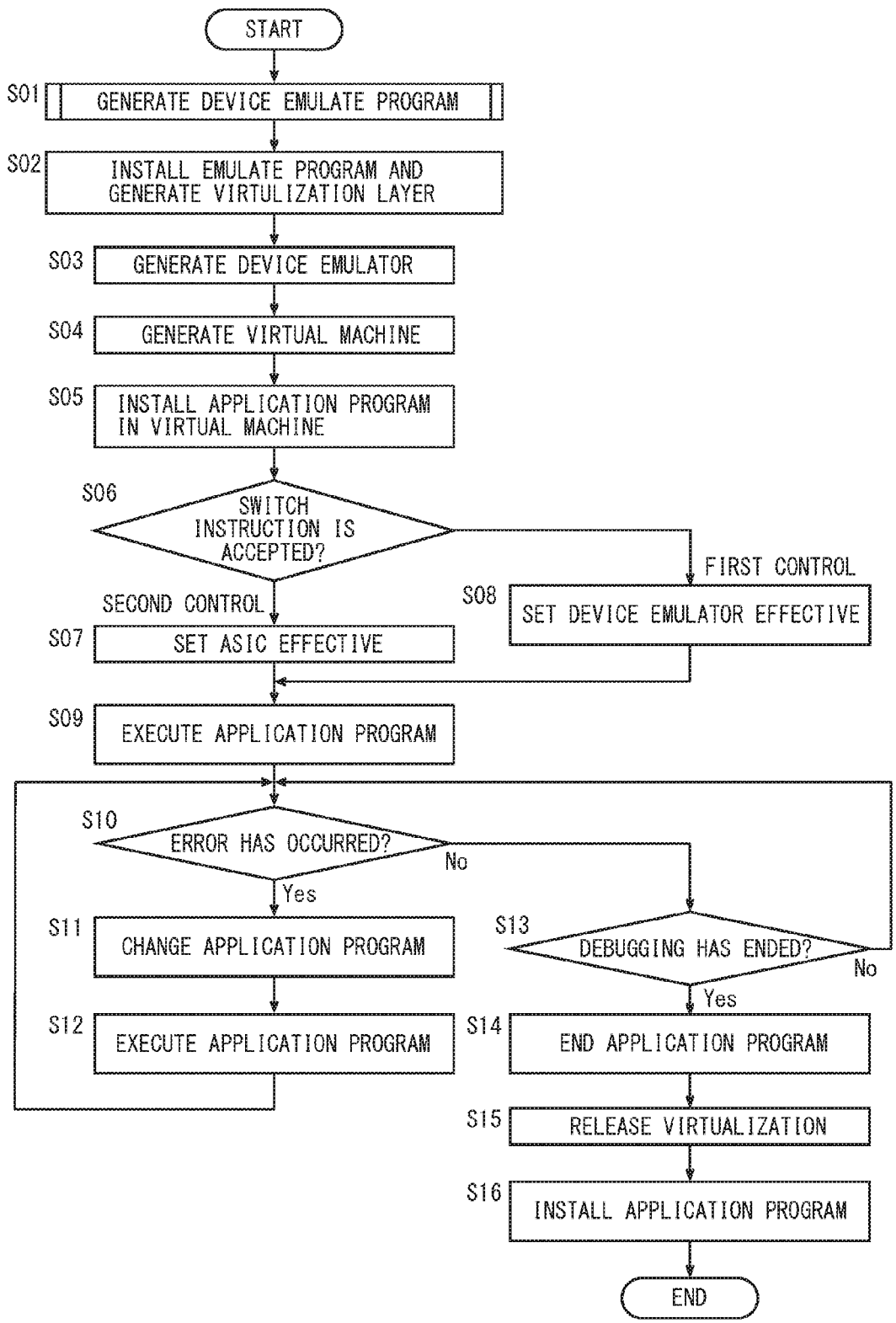
FIG. 8 is a flow chart showing one example of a flow of a debugging process.

FIG. 8 is a flow chart showing one example of a flow of a debugging assistance process. Referring to FIG. 8, the CPU 111 executes a device emulate program generation process (step S01). While the details of the device emulate program generation process are described below, the device emulate program generation process is a process of generating a device emulate program for emulating a hardware resource, which is the ASIC 115 in this case. In the next step S02, the CPU 111 installs the emulate program and generates a virtualization layer. Then, a device emulator is generated (step S03). Specifically, the CPU 111 generates the device emulator by installing the device emulate program generated in the virtualization layer in the step S01. The device emulator is a task formed in the case where the CPU 111 executes the device emulate program.

In the next step S04, a virtual machine is generated. Specifically, an operating system program is installed on the basis of the virtualization layer. The operating system program is the same operating system program as the operating system program originally installed in the CPU 111.

In the step S05, an application program is installed in the virtual machine. The application program is a program that defines a process of controlling the hardware resource of the MFP 100, which is the ASIC 115 in this case, and is subject to debugging.

In the next step S06, the CPU 111 determines whether a switch instruction has been accepted. The CPU 111 accepts a switch instruction in accordance with an operation of inputting in the operation unit 163 by the user. The switch instruction is either an instruction for switching the control to the first control or an instruction for switching the control to the second control. If the instruction for switching the control to the first control is accepted, t the ASIC 115 is set effective (step S07), and the process proceeds to the step S09. If the instruction for switching the control to the second control is accepted, the device emulator generated in the step S03 is set effective (step S08), and the process proceeds to the step S09.

In the step S09, the CPU 111 executes the application program installed in the step S05, and the process proceeds to the step S10. A task formed in the case where the CPU 111 executes the application program sometimes defines a process of controlling the ASIC 115. If the ASIC 115 is set effective in the step S07, in the case where the ASIC 115 is controlled by a task formed by the execution of the application program, the CPU 111 allows the ASIC 115 to execute the process. Further, in the case where the device emulator is set effective in the step S08, when the ASIC 115 is controlled by a task formed in the case where the CPU 111 executes the application program, the CPU 111 allows the device emulator generated in the step S03 to execute the process.

In the step S10, the CPU 111 determines whether an error has occurred. If an error has occurred, the process proceeds to the step S11. If not, the process proceeds to the step S13. The occurring error here also includes an error that occurs in the device emulator in addition to an error that occurs due to a task formed in the case where the CPU 111 executes the application program. The user of the MFP 100 can specify the cause of the error in the application program based on the occurring error. The user changes the application program based on the specified cause of the error. In the step S11, the CPU 111 accepts the change of the application program (step S11), and the process proceeds to the step S12. The CPU 111 compiles the changed application program as necessary. In the step S12, the CPU 111 executes the changed application program, and the process returns to the step S10.

In the step S13, the CPU 111 determines whether the debugging has ended. If an operation of inputting in the operation unit 163 by the user is an operation that indicates the end of debugging, the process proceeds to the step S14. If not, the process returns to the step S10. In the step S14, the CPU 111 ends the application program, and the process proceeds to the step S15. In the step S15, the CPU 111 releases the virtualization. Specifically, the CPU 111 uninstalls the operating system program installed in order to generate the virtual machine, and uninstalls the emulate program. Then, the CPU 111 installs the debugged application program (step S16), and the process ends.

Figure 9:
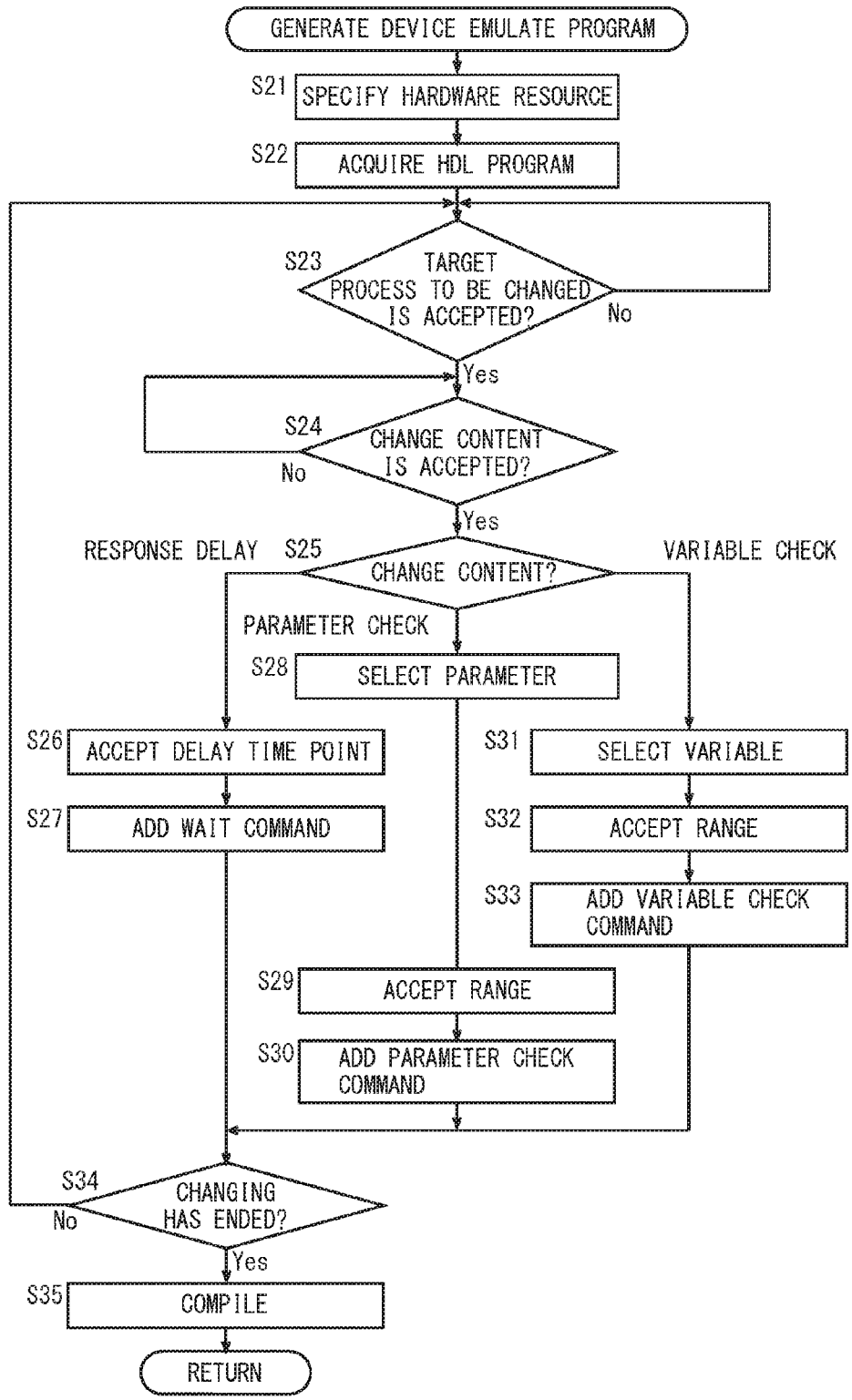
FIG. 9 is a flow chart showing one example of a flow of a device emulator generation process.

FIG. 9 is a flow chart showing one example of a flow of a device emulator generation process. The device emulator generation process is a process executed by the CPU 111 in the step S01 of FIG. 8. Referring to FIG. 9, the CPU 111 specifies a target hardware resource. The CPU 111 displays a list of a plurality of hardware resources included in the MFP 100 in the display unit 161 in a selectable manner, and specifies the hardware resource selected by an operation of inputting in the operation unit 163 by the user. The case where the ASIC 115 is selected by the user is described here as an example.

In the next step S22, the HDL program compatible with the hardware resource specified in the step S21, that is, the ASIC 115 in this case, is acquired. If the HDL program compatible with the ASIC 115 is acquired in advance from the manufacturer of the ASIC 115 and is stored in the HDD 116, the CPU 111 reads out the HDL program.

In the next step S23, the process waits until the target process to be changed is accepted. If the target process to be changed is accepted, the process proceeds to the step S24. For example, the CPU 111 analyzes the HDL program, specifies one or more processes defined by the HDL program, displays a list of one or more specified processes in the display unit 161 in a selectable manner, and specifies a process selected by an operation of inputting in the operation unit 163 by the user as the target process to be changed.

In the step S24, the process waits until the CPU 111 accepts the change content. If the change content is accepted, the process proceeds to the step S25. The case where response delay, parameter check or variable check is defined in advance as the change content is described here as an example. The change content of the response delay indicates addition of a process of delaying a time point at which a response is output since the ASIC 115 is controlled. The parameter check indicates addition of a process of determining whether a parameter input in the ASIC 115 is a correct value. The variable check indicates addition of a process of determining whether a variable used in the ASIC 115 is a correct value. In the step S25, the process branches according to the change content accepted in the step S24. If the change content is the response delay, the process proceeds to the step S26. If the change content is the parameter check, the process proceeds to the step S28. If the change content is the variable check, the process proceeds to the step S31.

In the step S26, a delay time point is accepted, and the process proceeds to the step S27. For example, a screen for setting the delay time point is displayed in the display unit 161, and the CPU 111 accepts the delay time point specified by an operation of inputting in the operation unit 163 by the user. Then, a wait command is added to the HDL program acquired in the step S22 (step S27), and the process proceeds to the step S34. Specifically, a wait command for waiting until the delay time point accepted in the step S26 is added to the end of a segment describing the target process to be changed accepted in the step S23.

In the step S28, a parameter is selected, and the process proceeds to the step S29. The CPU 111 analyzes the HDL program acquired in the step S22, specifies a parameter defined by the HDL program for the target process to be changed accepted in the step S23, displays a list of one or more specified parameters in the display unit 161 in a selectable manner, and specifies a parameter selected by an operation of inputting in the operation unit 163 by the user as a target parameter. In the step S29, a range, which the parameter can take, is accepted, and the process proceeds to the step S30. A screen for setting the range is displayed in the display unit 161, and the CPU 111 specifies a range specified by an operation of inputting in the operation unit 163 by the user. Then, a parameter check command is added to the HDL program acquired in the step S22 (step S30), and the process proceeds to the step S34. Specifically, a command for detecting that the parameter is outside of the set range and a command for indicating a process to be executed in the case where it is detected that the parameter is outside of the set range, are added to a segment preceding a segment describing the target parameter included in a segment describing the target process to be changed accepted in the step S23 in the HDL program.

In the step S31, a variable is selected, and the process proceeds to the step S32. The CPU 111 analyzes the HDL program acquired in the step S22, specifies a variable defined by the HDL program for the target process to be changed accepted in the step S23, displays a list of one or more specified variables in the display unit 161 in a selectable manner, and specifies a variable selected by an operation of inputting in the operation unit 163 by the user as a target variable. In the step S32, a range, which the variable can take, is accepted, and the process proceeds to the step S33. A screen for setting the range is displayed in the display unit 161, and the CPU 111 specifies the range specified by an operation of inputting in the operation unit 163 by the user. Then, a variable check command is added to the HDL program acquired in the step S22 (step S33), and the process proceeds to the step S34. Specifically, a command for detecting that the variable is outside of the set range and a command for indicating a process to be executed in the case where it is detected that the variable is outside of the set range, are added to a segment preceding a segment describing the target variable included in the segment describing the target process to be changed accepted in the step S23.

In the step S34, the CPU 111 determines whether the change of the HDL program has ended. If the operation unit 163 accepts an operation that indicates the end of the change of the HDL program, the process proceeds to the step S35. If not, the process returns to the step S23.

In the step S35, the CPU 111 compiles the changed HDL program, and the process returns to the debugging process. The changed HDL program is compiled, so that the device emulate program is generated.

As described above, in the MFP 100 in the present embodiment, a process described by the HDL program compatible with the ASIC 115 is changed. Further, the control is changed to any one of the first control for controlling the ASIC 115 in accordance with the control of the ASIC 115 by the task formed by the execution of the second application program, and the second control for executing the HDL program that is changed in accordance with the control of the ASIC 115 by the task formed by the execution of the second application program. Therefore, in the case where the control is switched to the second control, the CPU 111 can emulate the changed operation of executing a process executable by the ASIC 115. Therefore, it is possible to reproduce a state where an operation of the hardware resource is changed without the change of the hardware resource. Further, it is possible to facilitate finding a bug in a segment describing a process of controlling the ASIC 115 in the second application program.

Further, the HDL program compatible with the ASIC 115 selected by the user from among the plurality of hardware resources is acquired, and the acquired HDL program is changed based on the instruction given by the user. Therefore, the MFP 100 can reproduce a state where the operation of the ASIC 115 selected by the user is changed based on the instruction given by the user.

Further, a wait command is added to the end of a description of the process designated by the user in the HDL program of the ASIC 115, so that the MFP 100 can delay a time point at which the ASIC 115 outputs a result of the execution of the process designated by the user. Therefore, the frequency, of an occurrence of a defect during a period from the time when the ASIC 115 executes the process designated by the user until the ASIC 115 outputs the result, can be increased. Therefore, it is possible to facilitate finding a bug in the description of the process of controlling the ASIC 115 by the second application program.

Further, a command for checking a parameter used in the process designated by the user in the HDL program of the ASIC 115 is added, so that the MFP 100 can check a parameter externally accepted by the ASIC 115. Therefore, it is possible to facilitate finding a bug in the description of the process of controlling the ASIC 115 by the second application program.

Further, a command for checking a variable used in the process designated by the user in the HDL program of the ASIC 115 is added, so that the MFP 100 can check a variable used in the process by the ASIC 115. Therefore, it is possible to facilitate finding a bug in the description of the process of controlling the ASIC 115 by the second application program.

While the ASIC 115 is described as one example of the hardware resources in the above-mentioned embodiment, the process can also be similarly reproduced for the other hardware resources, such as the communication I/F unit 112, the ROM 113, the RAM 114, the HDD 116, the facsimile unit 117, the external storage device 118, the automatic document feeder 120, the document scanning unit 130, the image forming unit 140, the paper feed unit 150 and the operation panel 160. Further, an FPGA (Field Programmable Gate Array) may be used instead of the ASIC.

In the present embodiment, the MFP 100 is described as one example of the image processing apparatus. However, it may be a facsimile device, a scanner device or a camera, for example, as long as an application program that defines a process of controlling the hardware resource is installed in the device. Further, the present invention can be regarded as a debugging assistance method for allowing the MFP 100 to execute the debugging assistance process shown in FIGS. 8 and 9.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image processing apparatus comprising:
   a hardware processor, wherein the hardware processor includes
      a host controller that is formed by execution of an operating system program and controls a hardware resource;
      a guest controller, different from the host controller, that is formed by execution of the same operating system program;
      an emulator that is provided between the host controller and the guest controller and allows the guest controller to control the hardware resource; and
      a changer that (i) changes an HDL program compatible with the hardware resource, (ii) compiles the changed HDL program, and (iii) outputs the changed HDL program to the emulator;
   wherein the guest controller includes a guest driver that is formed by execution of a driver program for controlling the hardware resource, and
   wherein the emulator includes
      a device emulator that emulates the hardware resource by executing the changed HDL program received from the changer, and
      a switcher that switches control between a first control and a second control, wherein (i) when switched to said first control, the hardware resource is set effective such that the guest driver controls the hardware resource, and (ii) when switched to said second control, the device emulator is set effective, emulating the hardware resource, such that the guest driver controls the device emulator.

2. The image processing apparatus according to claim 1, further comprising a plurality of the hardware resources, wherein the hardware processor further includes
   a resource specifier that specifies a hardware resource selected by a user from among the plurality of the hardware resources, and
   a program acquirer that acquires an HDL program compatible with the specified hardware resource,
   the changer changes the acquired HDL program based on an instruction given by the user, and
   the switcher switches control for the specified hardware resource to any one of the first control and the second control.

3. The image processing apparatus according to claim 1, wherein
   the changer includes an extension command addition portion that adds a command for extending a response time period from a time when the hardware resource executes a process until a time when a result is output.

4. The image processing apparatus according to claim 1, wherein
   the changer includes a parameter check command addition portion that adds a command for checking a parameter accepted from the guest driver in order for the hardware resource to execute a process.

5. The image processing apparatus according to claim 1, wherein
   the changer includes a variable check command addition portion that adds a command for checking a variable that changes due to execution of a process by the hardware resource.

6. The image processing apparatus according to claim 1, wherein
   the hardware resource is an ASIC (Application Specific Integrated Circuit).

7. The image processing apparatus according to claim 1, wherein
   the hardware resource is an FPGA (Field Programmable Gate Array).

8. The image processing apparatus according to claim 1, wherein
   the hardware processor further includes an application executer that is formed by execution of an application program defining a process of controlling the guest controller in order for the guest controller to control the hardware resource.

9. The image processing apparatus according to claim 1, wherein the changer is provided between an input control and the emulator.

10. A debugging assistance method for debugging an application program executed in an image processing apparatus,
    the image processing apparatus comprising:
       a host controller that is formed by execution of an operating system program and controls a hardware resource;
       a guest controller, different from the host controller, that is formed by execution of the same operating system program;
       an emulator that is provided between the host controller and the guest controller and allows the guest controller to control the hardware resource, and
       a changer, wherein
       the guest controller includes a guest driver that is formed by execution of a driver program for controlling the hardware resource, and
    the debugging assistance method comprises:
       a changing step of (i) changing an HDL program compatible with the hardware resource, (ii) compiling the changed HDL program, and (iii) outputting the changed HDL program to the emulator, and
       a switching step of switching, by a switcher of the emulator, control between a first control and a second control, wherein (i) when switched to said first control, the hardware resource is set effective such that the guest driver controls the hardware resource, and (ii) when switched to said second control, the device emulator is set effective, emulating the hardware resource, such that the guest driver controls the device emulator.

11. The debugging assistance method according to claim 10, wherein
the image processing apparatus includes a plurality of the hardware resources, and
the debugging assistance method further includes
a resource specifying step of specifying a hardware resource selected by a user from among the plurality of the hardware resources, and
a program acquisition step of acquiring an HDL program compatible with the specified hardware resource,
the changing step includes changing the acquired HDL program based on an instruction given by the user, and
the switching step includes switching control for the specified hardware resource to any one of the first control and the second control.

12. The debugging assistance method according to claim 10, wherein
the changing step includes an extension command addition step of adding a command for extending a response time period from a time when the hardware resource executes a process until a time when a result is output.

13. The debugging assistance method according to claim 10, wherein
the changing step includes a parameter check command addition step of adding a command for checking a parameter accepted from the guest driver in order for the hardware resource to execute a process.

14. The debugging assistance method according to claim 10, wherein
the changing step includes a variable check command addition step of adding a command for checking a variable that changes due to execution of a process by the hardware resource.

15. The debugging assistance method according to claim 10, wherein the hardware resource is an ASIC (Application Specific Integrated Circuit).

16. The debugging assistance method according to claim 10, wherein the hardware resource is an FPGA (Field Programmable Gate Array).

17. The debugging assistance method according to claim 10, wherein the hardware processor further includes an application executer that is formed by execution of an application program defining a process of controlling the guest controller in order for the guest controller to control the hardware resource.

18. A non-transitory computer-readable recording medium encoded with a debugging assistance program allowing a computer that controls the image processing apparatus to perform the debugging assistance method according to claim 10.

19. The debugging assistance method according to claim 10, wherein the changer is provided between an input control and the emulator.

* * * * *